(12) United States Patent
West et al.

(10) Patent No.: US 6,789,347 B1
(45) Date of Patent: Sep. 14, 2004

(54) VIBRATING FISHING LURE WITH FRICTIONALLY FIXED CONDUCTOR PINS

(75) Inventors: Daron K. West, 8725 Old Federal Rd., Ballground, GA (US) 30107; Frederik D Penz, Marietta, GA (US)

(73) Assignee: Daron K. West, Ballground, GA (US)

( * ) Notice: Subject to any disclaimer, the term of this patent is extended or adjusted under 35 U.S.C. 154(b) by 0 days.

(21) Appl. No.: 10/208,482

(22) Filed: Jul. 30, 2002

Related U.S. Application Data

(63) Continuation-in-part of application No. 09/906,942, filed on Jul. 18, 2001, now Pat. No. 6,665,976, which is a continuation-in-part of application No. 09/740,750, filed on Dec. 19, 2000, now Pat. No. 6,581,319.

(51) Int. Cl.[7] ............................................... A01K 85/02
(52) U.S. Cl. .......................................... 43/17.1; 43/26.2
(58) Field of Search ................. 43/17.1, 17.6, 43/42.31

(56) References Cited

U.S. PATENT DOCUMENTS

| | | | |
|---|---|---|---|
| 2,757,475 A | 8/1956 | Pankove ...................... 43/17.1 |
| 3,310,902 A | * 3/1967 | Godby ......................... 43/17.1 |
| 3,728,811 A | 4/1973 | Weimer ...................... 43/42.12 |
| 3,741,012 A | * 6/1973 | Day .......................... 73/150 A |
| 3,841,012 A | 10/1974 | Maled ......................... 43/26.2 |
| 3,940,868 A | 3/1976 | Northcutt ..................... 43/17.6 |
| 4,223,467 A | 9/1980 | Hodges, Jr. et al. ........ 43/42.31 |
| 4,380,132 A | 4/1983 | Atkinson ..................... 43/26.2 |
| 4,416,080 A | 11/1983 | Morrissette .................. 43/42.2 |
| 4,515,422 A | * 5/1985 | Pritulsky ....................... 439/82 |
| 4,602,451 A | 7/1986 | Perez et al. ................... 43/26.1 |
| 4,714,208 A | 12/1987 | Holahan et al. .......... 242/84.52 |
| 4,805,339 A | 2/1989 | Fuentes et al. .............. 43/42.31 |
| 5,105,573 A | 4/1992 | Mays ........................... 43/17.1 |
| 5,157,857 A | * 10/1992 | Livingston ................... 43/17.6 |
| 5,175,951 A | * 1/1993 | Fruchey ....................... 43/17.6 |
| 5,406,734 A | 4/1995 | Ho et al. ....................... 43/17.1 |
| 5,485,697 A | 1/1996 | Watson et al. .............. 43/42.31 |
| 5,697,182 A | * 12/1997 | Rodgers ...................... 43/17.1 |
| 5,875,582 A | 3/1999 | Ratzlaff et al. ............... 43/26.1 |
| 5,983,553 A | 11/1999 | Gordon ........................ 43/17.6 |
| 6,035,574 A | 3/2000 | Ware .......................... 43/42.06 |
| 6,047,492 A | 4/2000 | Watson et al. .............. 43/42.31 |
| 6,050,022 A | 4/2000 | Brick ........................... 43/26.2 |
| 6,057,753 A | 5/2000 | Myers ....................... 340/407.1 |
| 6,108,962 A | 8/2000 | Barron ........................ 43/42.31 |
| 6,108,963 A | 8/2000 | Lucas et al. ................ 43/42.31 |
| 6,192,617 B1 | 2/2001 | Lyles ........................... 43/42.06 |
| 6,305,120 B1 | * 10/2001 | Boys ........................... 43/43.12 |
| 2002/0014031 A1 | 2/2002 | Brinkman .................. 43/42.31 |

FOREIGN PATENT DOCUMENTS

WO     WO 99/21416     5/1999

* cited by examiner

Primary Examiner—Charles T. Jordan
Assistant Examiner—Susan C. Alimenti
(74) Attorney, Agent, or Firm—Withers & Keys, LLC

(57) ABSTRACT

A vibrating fishing lure provides a circuit board to control application of power from a battery to an electric motor within a cavity of the lure body. The circuit board includes pin receptacles that receive conductor pins of one or more of the various components to allow the components to be plugged in and frictionally fixed to the circuit board to establish electrical connection. Furthermore, the conductor pins frictionally fixed to the circuit board may be non-corrosive so that they may be exposed to the water without corroding.

12 Claims, 10 Drawing Sheets

VIBRATING FISHING LURE WITH FRICTIONALLY FIXED CONDUCTOR PINS

RELATED APPLICATIONS

This application is a continuation-in-part of Ser. No. 09/906,942 filed on Jul. 18, 2001 under the title "Oscillating Fishing Lure", by the inventor hereof, now U.S. Pat. No. 6,665,976, which is a continuation-in-part of Ser. No. 09/740,750, filed Dec. 19, 2000, under the title, "Battery Powered Vibrating Fishing Lure", by the inventor hereof, now U.S. Pat. No. 6,581,319, where the contents thereof are incorporated herein by reference.

FIELD OF THE INVENTION

This invention is directed to the field of fishing lures, more particularly to a battery powered vibrating fishing lure providing conductor pins frictionally fixed to a circuit board.

BACKGROUND OF THE INVENTION

The present invention relates to a unique fishing lure of the type to simulate live fish bait to attract fish to be caught. The purpose of any fishing lure is to attract a fish by mimicking a creature which is a part of the normal diet of the fish, such as a worm, amphibian, or smaller fish. Among the expedients taught by the prior art are arrangements for producing sounds and vibrations. For example, U.S. Pat. No. 2,552,730, to Miller, provides a leaf spring which vibrates when the fishing line is given a sudden jerk. Since the spring vibrates in the water, however, the vibrations are of only short duration and thus effective only if a fish is in the immediate vicinity of the lure at the instant the spring is put in motion. U.S. Pat. No. 2,909,863, to Rector et al., discloses a lure which produces a knocking or tapping sound, by means of a weight striking the walls of the hollow interior of the lure. The action of this lure depends upon movement of the lure through the water, and, consequently, results in an erratic tapping rather than uniform vibrations. A piezoelectric transducer powered by a transistorized oscillator circuit is utilized in the lure shown in U.S. Pat. No. 2,757,475, to Pankove.

Further, plug-type lures having internal eccentric, vibrating or buzzing means for producing noise and lure vibration are known in the art. Typical of these lures is the Eccentric Motion Fishing Lure described in U.S. Pat. No. 3,841,012, to Maled, which includes a lure characterized by a hollow body which is caused to vibrate by a rotor, motor and battery combination located inside the body cavity. The battery is wired to the motor and drives an eccentrically mounted weight on the motor output shaft, which weight rotates and strikes the inside cavity of the body to produce vibration, motion, and sound. Another similar lure of the plug design is the Sonic Fishing Lure described in U.S. Pat. No. 3,310,902, to Godby, which lure includes a vibrating coil and breaker point system which are energized by a battery and activated by a switch means operated by tension applied to the connecting line. Buzzing or vibrating of the internal coil and breaker point system is accomplished by pulling or jerking the line to slidably displace the switch with respect to the lure body, and thus complete the electrical circuit.

More recent developments for vibrating lures are described in the further U.S. Patents, namely:

a.) U.S. Pat. No. 4,223,467, to Hodges, Jr. et al., teaches a vibrating fishing lure which includes a hollow body carrying at least one set of hooks and a coil and breaker point vibrator combination mounted in the hollow interior of the body. The vibrator is activated by an attitude sensitive switch and is powered by a battery. The battery is removably positioned in a cylindrically shaped carrier and sleeve located inside the hollow body with access to the battery provided by a water tight threaded cap.

b.) U.S. Pat. No. 4,380,132, to Atkinson, discloses a fishing lure having a water-tight cavity with a wire spring within the cavity, one end of the spring being rigidly affixed to the lure body and the opposite end carrying a weight. The relationship between the cavity size and the weighted spring is such that the spring will oscillate freely within the cavity without the weight striking the cavity walls during normal movement of the lure through the water. Alternate forms of the invention utilize an electronic oscillator driven transducer to produce vibration of the lure body.

c.) U.S. Pat. No. 4,805,339, to Fuentes et al., relates to a sonic fishing lure having an energy source, an electrical circuit, and a sonic transducer, where are each respectively contained within chambers of a generally hollow cylindrically-shaped fishing lure. Due to the construction of the fishing lure, the sound output from the fishing lure is of a greater intensity and is produced for a longer period of time than that of prior art devices. The sound output from a coil activator vibrating plate type of transducer is enhanced by the addition of a second vibrating plate. A fluid connection between the outer surface of the sound transducer and the body of the fishing lure further enhances and intensifies the sound output by the fishing lure.

d.) U.S. Pat. No. 6,035,574, to Ware, teaches a fishing lure for producing vibrations of a pre-determined frequency to attract fish. The fishing lure is provided with a streamlined body to substantially eliminate sound generating turbulence as the fishing lure is pulled through the water. The body is also provided with a shaft passing through the body to cause water passing through the shaft to generate vibrations of a pre-determined frequency known to attract fish. A hook is securely fastened to the body to reduce excess noise otherwise associated with the hook contacting the body.

e.) U.S. Pat. No. 6,047,492, to Watson et al., discloses a fishing lure having a battery-powered oscillator circuit positioned within a water-resistant container module that is removably inserted into a selected body module. The module is balanced to insure proper lure action even as fish-attracting sounds and motions are generated from the container module.

From the foregoing discussion it is clear that there have been many attempts at providing the ideal fishing lure for the many fishermen looking for the best means for attracting a fish. However, electrically powered fishing lures such as those discussed above suffer from difficulty of manufacture and/or corrosion of any exposed conductors that are soldered to circuit boards.

SUMMARY OF THE INVENTION

Embodiments of the present invention address the problems mentioned above by providing an electrically powered vibrating fishing lure that provides frictionally fixed conductor pins. Rather than relying on soldering, frictionally fixed conductor pins allow components of the lure to be quickly and easily attached to the circuit board to improve manufacturing efficiency, and remain removable as well thereby facilitating repair. Furthermore, frictionally fixed conductor pins may be a non-corrosive material that is not solderable to the circuit board so that any conductor pins exposed to water do not corrode over time.

An embodiment of a vibrating fishing lure includes a lure body comprising a cavity and a hook attached to the lure body. A battery is disposed within the cavity, and an electric motor is also disposed within the cavity and configured to impart vibrations to the lure body. A first non-corrosive metal conductor is exposed from the lure body. A printed circuit board is disposed within the cavity and includes circuitry for powering the electric motor from the battery. The printed circuit board includes a first pin receptacle electrically connected to the circuitry, and the first conductor is partially disposed and frictionally fixed within the first pin receptacle.

An embodiment of a method of vibrating a fishing lure involves providing a first exposed non-corrosive conductor in electrical contact with an elongate cylindrical battery disposed within a cavity of the fishing lure. A second exposed non-corrosive conductor is partially disposed and frictionally fixed in a pin receptacle in electrical contact with circuitry that controls distribution of power from the elongate cylindrical battery to an eccentrically weighted electric motor disposed within the cavity of the fishing lure. The fishing lure is placed in water to pass electrical current through the water and between the first exposed non-corrosive conductor and the second exposed non-corrosive conductor to power the circuitry and cause power to be distributed by the circuitry to the electric motor.

An embodiment of a vibrating fishing lure includes a lure body comprising a cavity and a hook attached to the lure body. A battery disposed within the cavity, and an electric motor is also disposed within the cavity and is configured to impart vibrations to the lure body. The electric motor includes first and second conductor pins for receiving electric power. A printed circuit board is disposed within the cavity and includes circuitry for powering the electric motor from the battery. The printed circuit board includes first and second pin receptacles electrically connected to the circuitry, and the first and second conductor pins of the electric motor are at least partially disposed and frictionally fixed within the first and second pin receptacles.

DETAILED DESCRIPTION OF PREFERRED EMBODIMENT

Figure 1:
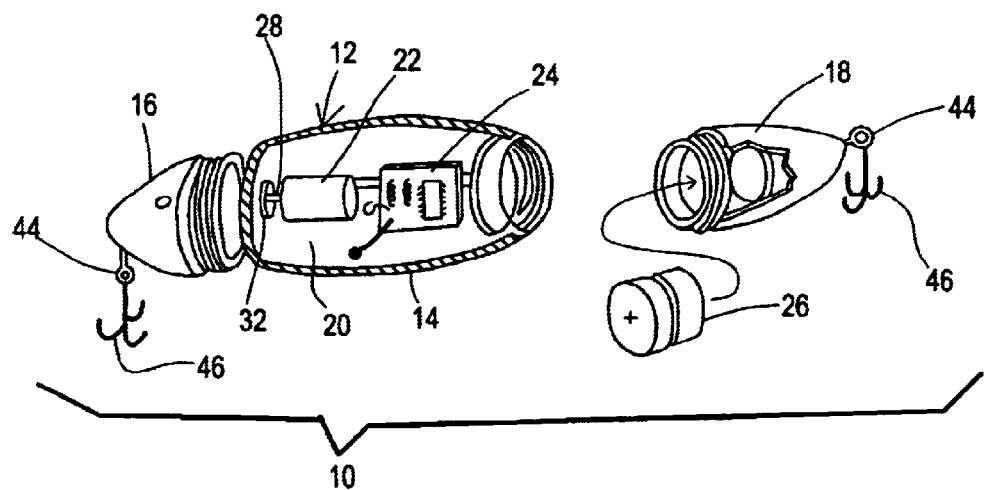
FIG. 1 is an exploded perspective view, with parts removed to reveal internal details, showing a preferred fishing lure body for the lure of this invention.

A first embodiment of this invention, the subject of said co-pending application, relates to a fishing lure that emanates a randomly emitting sound producing vibration to attract fish in the water. The lure may be shaped to simulate a variety of living creatures, such as a small fish, worms, amphibians, crawdads, bugs and the like, where a preferred embodiment is that of a small fish. The first embodiment for the fishing lure will now be described with regard to the FIGS. 1–6, where like reference numerals represent like components or features throughout the various views.

Figure 2:
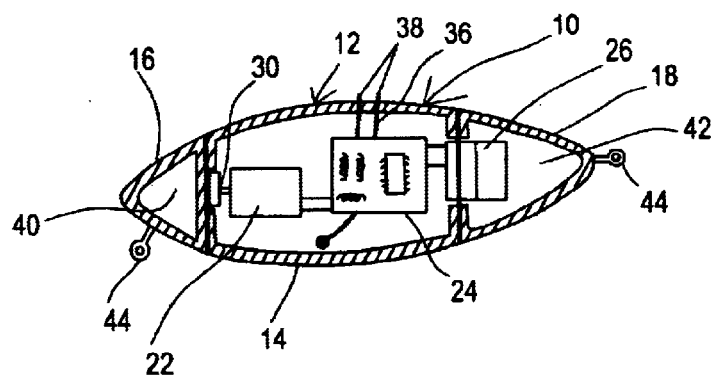
FIG. 2 is a sectional view of the assembled fishing lure of FIG. 1.

FIGS. 1 and 2 illustrate an exemplary fishing lure 10 according to the first embodiment of the present invention. The fishing lure 10 comprises a body 12 to simulate one of the types of living creatures noted above, and includes a hollow, central body portion 14, and a pair of hollow end portions 16, 18, threadably engaging in water tight relationship with respective ends of said central body portion 14. Internally disposed within the cavity 20 of said central body portion is a D.C. motor 22 electrically connected to a programmed microprocessor 24, as more clearly defined later, and a battery source 26, such as one or a pair of rechargeable 1.5 to 3 volt lithium or alkaline batteries, as known in the art, preferably disposed in one of said end portions 18.

Figure 3:
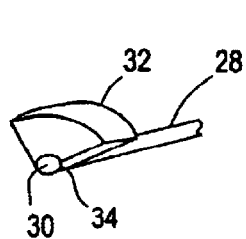
FIGS. 3 to 5 are perspective views of a first embodiment for the present invention, where said first embodiment relates to a vibrating lure that may incorporate eccentric shaped weights for removably securing same to the motor shaft to effect selective vibration of the first embodiment for the fishing lure thereof.
Figure 4:
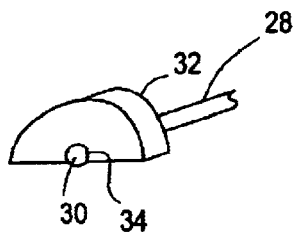
Figure 5:
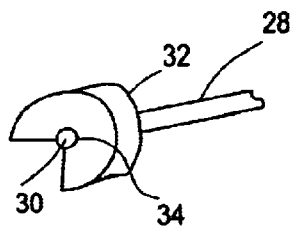

Extending from said D.C. motor 22 is a rotatable shaft 28 having a free end 30 mounting a weighted and unbalancing element 32 to effect vibration of the lure 10 when the D.C. motor is operable. To ensure the proper degree of vibration, the unbalancing element 32 may assume a variety of shapes, where three exemplary shapes are illustrated in FIGS. 3 to 5. The preferred shapes are arcuate in configuration with a radial extent of about 900 to about 270°, however it should be understood that this radial extent may vary as desired by the fisherman to maximize or minimize the vibration. FIG. 3 shows a quarter section, i.e. 90°, that may be desired to effect a maximum vibration, such as on a rainy or windy day where greater disturbance or action of the lure is desired. FIG. 4 illustrates a half section that may be used on calmer days, whereas FIG. 5 shows a three fourth section that provides minimum vibration, such as in quiet or calm still waters when finesse fishing is the order of the day. In each case, where the respective unbalancing elements 32 are preferably formed of plastic, or the like, the elements 32 include a shaft receiving slot 34 for snap engaging said free end of the rotatable shaft 28. This allows for the easy replacement of the weighted element 32 as the weather and fishing conditions may exist or dictate.

The brains of the fishing lure is the programmable microprocessor 24. The microprocessor may take the form of a stable timing circuit, such as a ThC555 Timer circuit, as manufactured by Archer and available from Radio Shack, a division of Tandy Corporation. The preferred timing circuit is a monolithic timing circuit fabricated using the LinCMOS process, where LinCMOS is a trademark for a silicon-gate IC process by Texas Instruments. The timing circuit includes a high-impedance input that is capable of producing accurate time delays and oscillations, and can achieve both monostable and astable operation. In the preferred latter operation, where the circuit includes a single capacitor and a pair of resistors, once the capacitor is charged, the capacitor releases its stored energy through a PNP transistor that acts as a switch to send direct power from the battery source 26 to the D.C. motor 22. Besides a manual switch operating in association with the PNP transistor, as known in the art, an automatic switching means may be incorporated into the lure 10. Alternatively, an automatic switching mechanism may be incorporated into the fishing lure in the form of a pair of electrodes 36, see FIGS. 1 and 2, that are exposed externally at leads 38. When the fishing lure is submersed in water, the water completes the electrical circuit between the respective leads, thus switching the circuit to ON to effect vibration of the fishing lure 10, see further the simplified circuit board of FIG. 6. The programmable microprocessor is operable to effect an automatic, intermittent or timed delay operation of the D.C. motor 22.

Returning to FIGS. 1 and 2, the respective hollow end portions 16, 18 include cavities 40, 42 to which may be added weights, as desired, to control the depth of the fishing lure 10, or buoyancy thereof. For example, no weights may be needed for a top floating lure, or selective weights may be used to control the depth of the lure. Additionally, externally the respective end portions may include eyelets 44 to which hook assemblies 46 may be removably attached.

Figure 7:
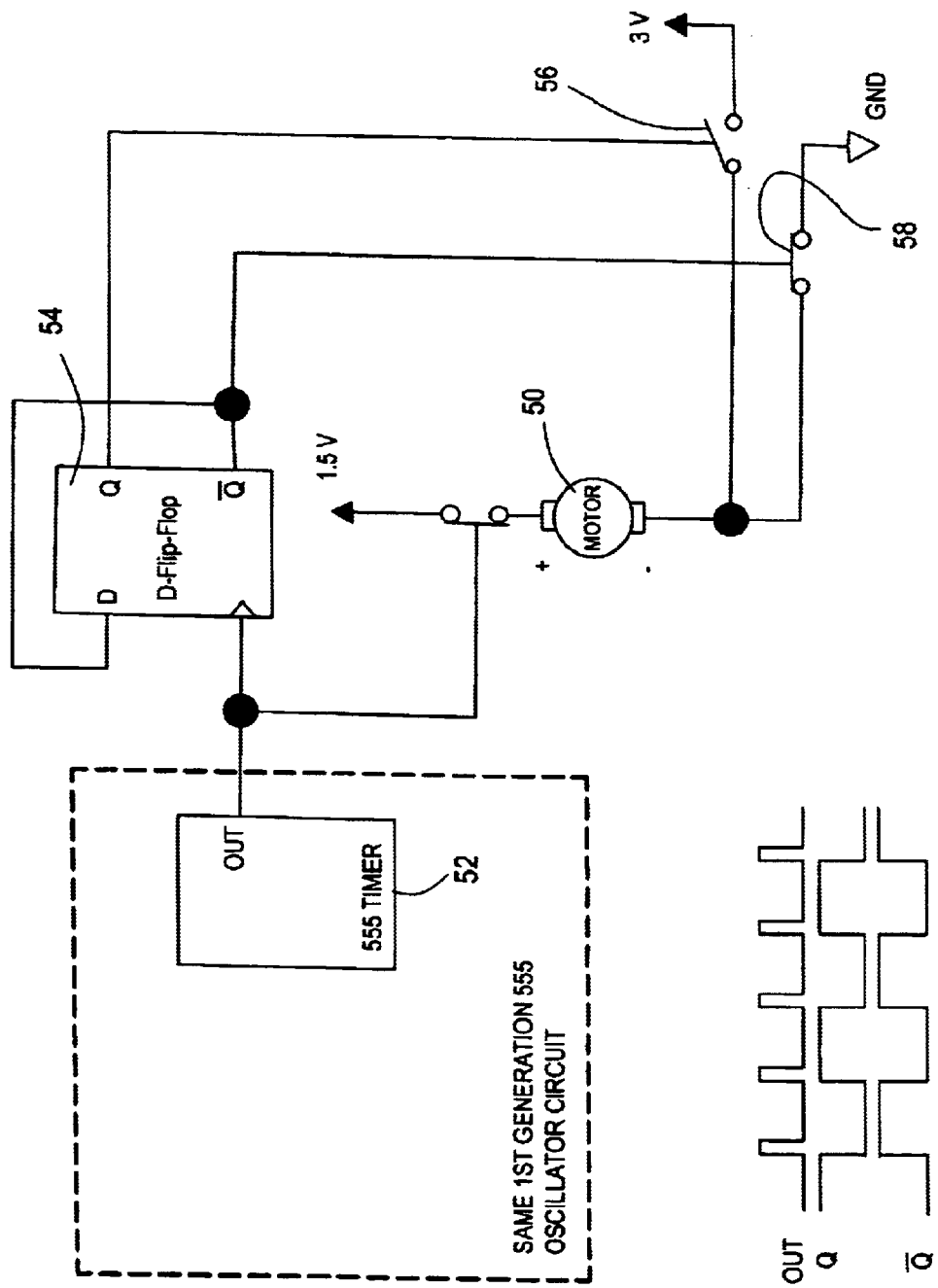
FIG. 7 is a simplified circuitry for the preprogrammed circuit board to effect oscillating of the fishing lure according to a second embodiment of this invention.

FIG. 7 illustrates a simplified circuit board for controlling and operating the oscillating action of the fishing lure according to the second embodiment. Before discussing the circuitry, it will be noted that the body of the fishing lure, according to the second embodiment, may take the shape of the lure as described above. As a consequence, the further description will be limited to the operation of the oscillating mechanism. Turning now to the circuit, the circuit works by flipping the polarity of the voltage across the motor 50 back and forth. With every pulse from the output of the 555 timer 52, as described above, the polarity across the motor 50 flips so that the motor will run clockwise with one pulse of the 555 timer and then counter clockwise with the next pulse. The flipping of the polarity of the motor is controlled by a D-flip flop 54, as known in the art. The flip flop is configured such that each time it is clocked, that is each time a pulse from the 555 timer is received, the Q and Q-outputs change state. The Q and Q-outputs are always in the opposite state from each other, for example, if Q is high, then Q- is low. The Q and Q-outputs then control switches 56, 58, such as transistor switches, as known in the art, to select the voltage polarity across the motor 50. The switches 56, 58 swap in and out 3V and GND on the negative side of the motor. Note that the switches are never both closed at the same time because they are controlled by Q and Q- which are always in an opposite state from each other. When GND is connected to the negative side of the motor, current flows into the positive side, through the motor, and into GND. When 3V is connected to the negative side of the motor 50, current flows into the negative side, through the motor, and into 1.5V to thereby reverse the motion of the motor.

Figure 8B:
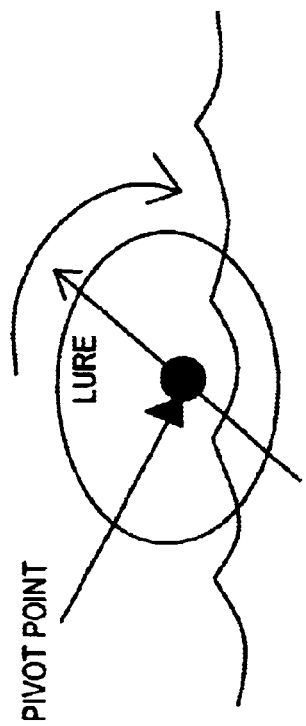
FIGS. 8A and 8B are simplified sectional views of the fishing lure for the second embodiment, showing the extent of oscillating movement, respectively, a counterclockwise movement and a clockwise movement of the lure thereof.
Figure 8A:
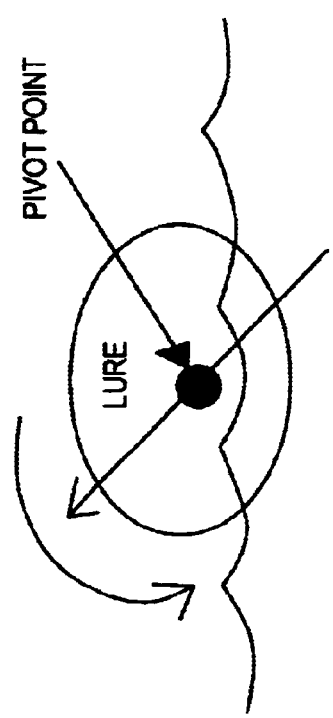

It was discovered that when the current to the motor shuts off, the fishing lure continues to move from side to side, see FIGS. 8A and 8B showing the oscillating movement to be experienced by the fishing lure according to the second embodiment hereof This movement is caused by the torque of the motor shutting down, where a preferred running time is 1.5 seconds ON, and 0.5 seconds OFF. Further, during the initial activation of the fishing lure in the clockwise direction there is rotational movement with lateral sway and slight flexion and extension also. To increase the overall movement of the fishing lure the motor switches direction at a point when the lure is swinging back in a clockwise direction creating additional force, thus providing more movement for the lure.

Figure 9:
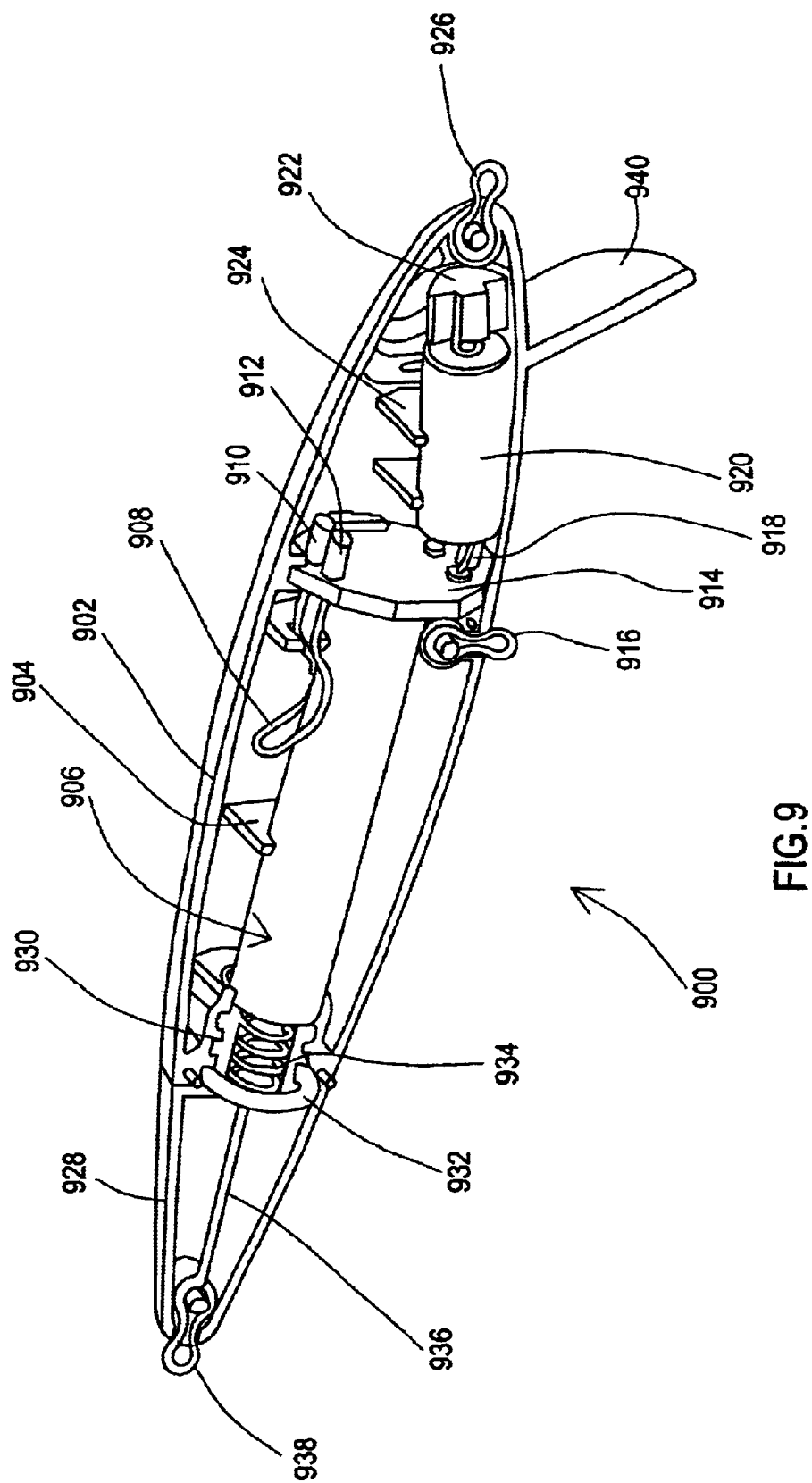
FIG. 9 shows an embodiment of a fishing lure having one half of the lure body removed to expose the internal components and their relative position.

FIG. 9 shows a view of one embodiment of a fishing lure 900 with one half of the lure body removed. The remaining lure body half 902 is shown and the relative placement of components within the lure body can be seen. The lure 900 includes an elongated cylindrical battery 906 such as an AAAA size battery. As can be seen, the elongated battery has a length that is substantially greater than the diameter. Similarly, the lure 900 includes an elongated electric motor 920, and the lure body itself is elongated.

The battery 906 is held in place by ribs 904 within the cavity of the lure body. The ribs 904 mate with symmetrical ribs from the other lure body half to form an aperture that the battery 906 is positioned within. A removable tail section 928 has a threaded engagement 930 with the lure body and holds the batter within the body. An O-ring 932 is provided between the tail section 928 and lure body to provide a water-tight seal.

The battery 906 can be removed from the lure 900, such as to be recharged if a rechargeable battery is used or to be replaced with a new battery 906. The tail section 928 is disengaged from the lure body 902 and the battery 906 can be pulled from the cavity through the aperture in the ribs 904. A battery can be installed by removing the tail section 928 if not already removed and inserting the battery through the apertures of the ribs 904 into the cavity until the battery abuts the circuit board 914. The tail section 928 is then reinstalled onto the lure body to hold the battery 906 in place.

Figure 6:
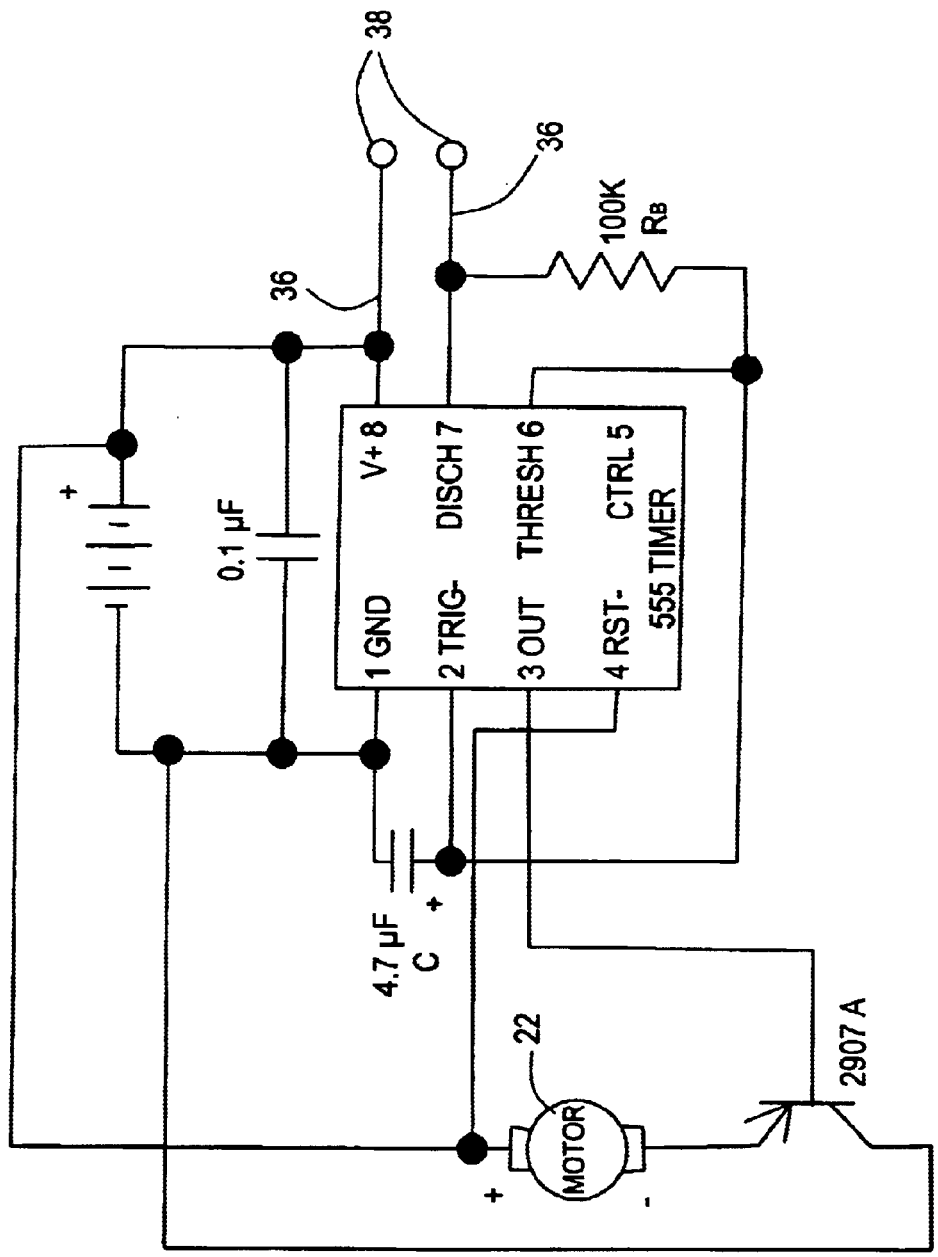
FIG. 6 is a simplified circuitry for the preprogrammed circuit board for operating the motor of the first embodiment.
Figure 13:
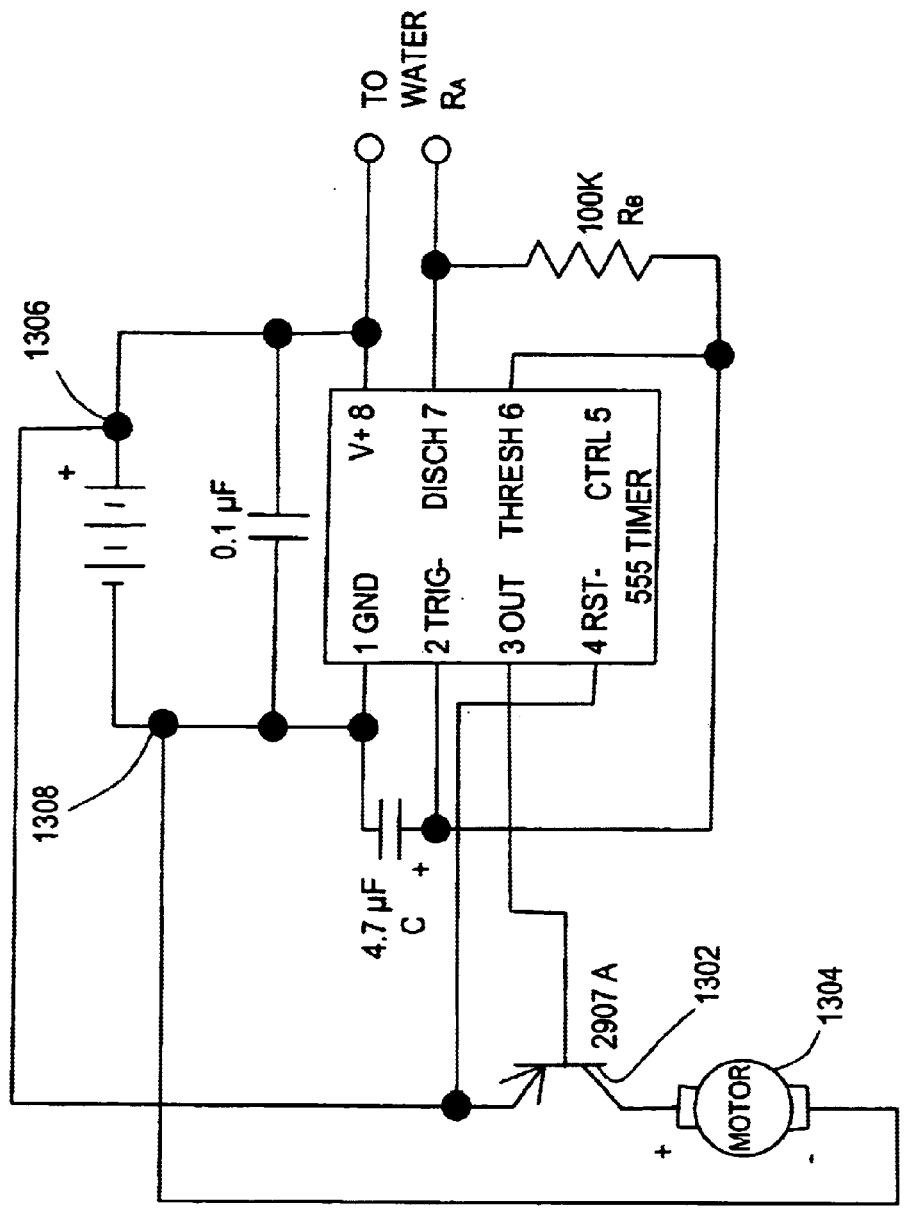
FIG. 13 shows an example of circuitry for the circuit board to effect vibration and/or oscillation and to maximize the engine speed.

An electrical conductor 936 passes through the tail section and contacts the battery 906 at one end 934 and is exposed beyond the end of the tail section at the other end 938. One end 934 is spring shaped to provide a bias against the battery 906 and thereby maintain physical and electrical contact with the end of the battery 906 that serves as a battery electrode. The other end 938 is exposed so that it contacts water and provides one terminal of a water switch as shown in FIG. 6 and FIG. 13 discussed below. The end 938 may be designed as a loop to allow a hook or fishing line to be attached. The conductor 936 may be made of a non-corrosive material such as stainless steel so that exposure to water does not corrode the terminal.

The can of the battery 906 serves as the same electrode as the end contacting the conductor 936. Therefore, another conductor 908 is used to contact the can of the battery 906 to provide a direct connection of this battery electrode to a circuit board 914. This direct connection is used to supply current from the battery 906 to the motor 920 without passing the current though a water switch so that voltage to drive the motor 920 is not decreased due to the resistance of the water. However, until the water switch completes the circuit, the control circuit does not receive power and therefore (see FIG. 6 or FIG. 13) does not permit current to flow to the electric motor 920 so that battery life is saved.

When in water, current flows between conductor 938 and conductor 916 to activate the timer control circuit. The circuit then controls the flow of current through the conductor 908 that is directed by the circuit to the motor 920.

Although in the embodiment shown the current provided to the motor 920 does not flow through water, it may be desirable to use a motor 920 with a relatively low winding resistance when using an elongated battery such as a AAAA size that produces a relatively low voltage such as 1.5 volts. Providing a lower winding resistance such as approximately 3 ohms provides increased vibration of the lure by maintaining an increased amount of electrical current in the winding.

An electrical conductor 916 forms the other terminal of the water switch, and may also be formed into a loop that can be attached to a hook or fishing line. This conductor 916 may also be made of a non-corrosive material. However, this conductor 916 connects directly to the circuit board 914 as does the conductor 908. To ease the manufacture and/or repair of the lure 900, the circuit board 914 includes pin receptacles 910, 912, and 918 that receive the conductor pins of conductor 908 and conductor 916. The pin receptacles have soldered electrical connections to the circuit board 914.

The conductors are pressed into the pin receptacles 910, 912, and 918 and are frictionally fixed within the receptacles. Therefore, the conductors can be easily inserted or removed and no soldering is required, thereby enabling non-corrosive materials to be used as the conductor pins. Examples of pin conductors are those manufactured by Mill-Max® Manufacturing of Oyster Bay, N.Y.

The electric motor 920 is eccentrically weighted by carrying an eccentric weight 922 on the motor shaft. The electric motor 920 is held in place by ribs 924 extending from the lure body halves. The electric motor 920 has two conductors that are electrically connected to the circuit board 914, such as by being frictionally fixed within additional pin receptacles.

The lure 900 contains additional features such as a front loop 926 that can receive a hook or fishing line. Also, the lure 900 includes a bill 940 that causes the lure 900 to dive when pulled forward in water.

Figure 10:
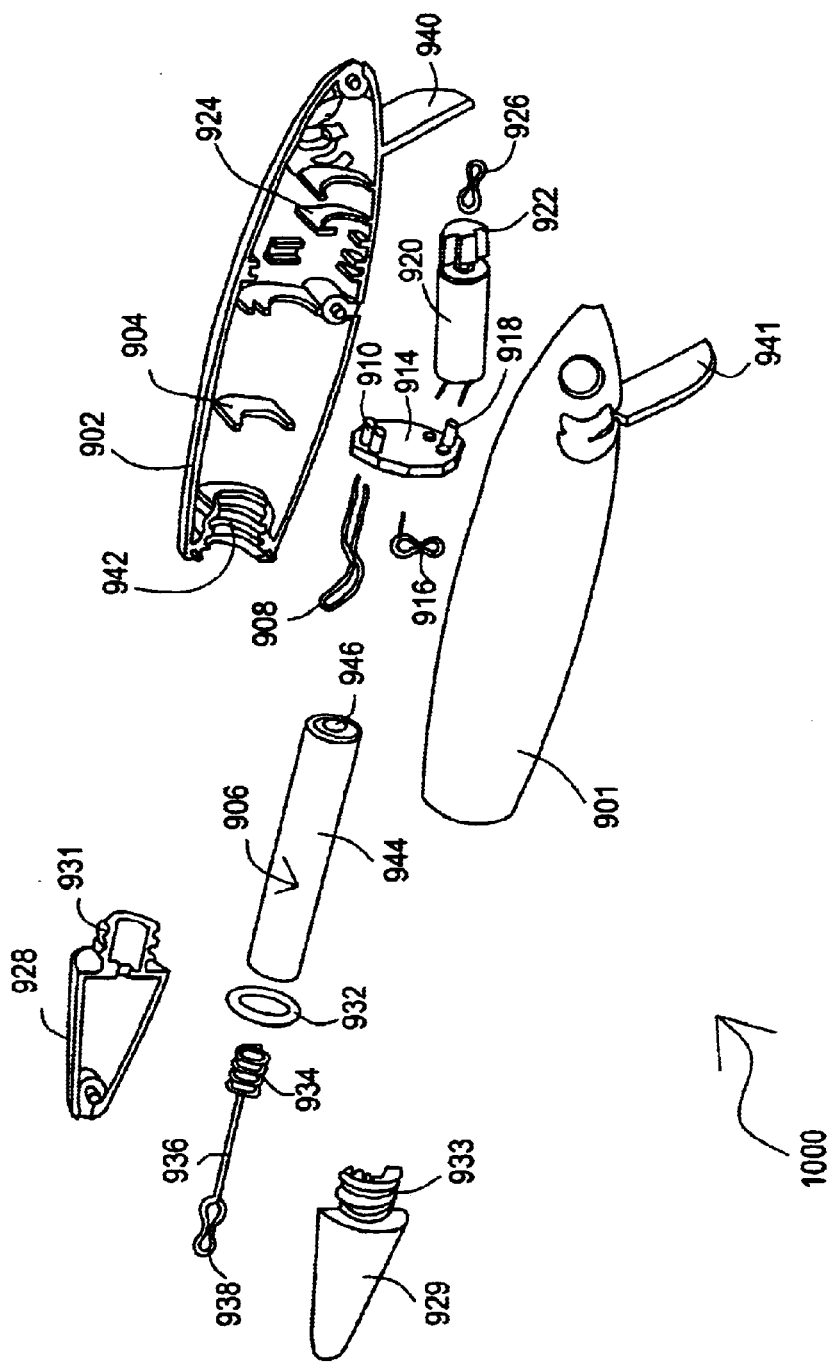
FIG. 10 shows an exploded view of the fishing lure of FIG. 9 to further illustrate the individual components.

FIG. 10 shows an exploded view of a complete lure 1000. The lure 1000 contains the same components as the lure of FIG. 9. The ribs 904 and 924 are more visible in FIG. 10, and it can be seen that the ribs 904 when mated with ribs from the opposing lure body half provide an aperture that receives the battery 906. Also more clearly shown, the battery 906 includes a can 944 forming one electrode and a tip 946 forming another electrode. The electrode 946 directly contacts a conductor on the circuit board 914.

FIG. 10 shows the other half 929 of the tail section that includes threads 933 that match threads 931 of tail half 928. These threads engage the threads 942 of the lure body half 902. The lure 1000 includes a lure body half 901 that mates to the lure body half 902. The lure body half 901 includes a bill 941 that adjoins the bill 940.

Figure 11:
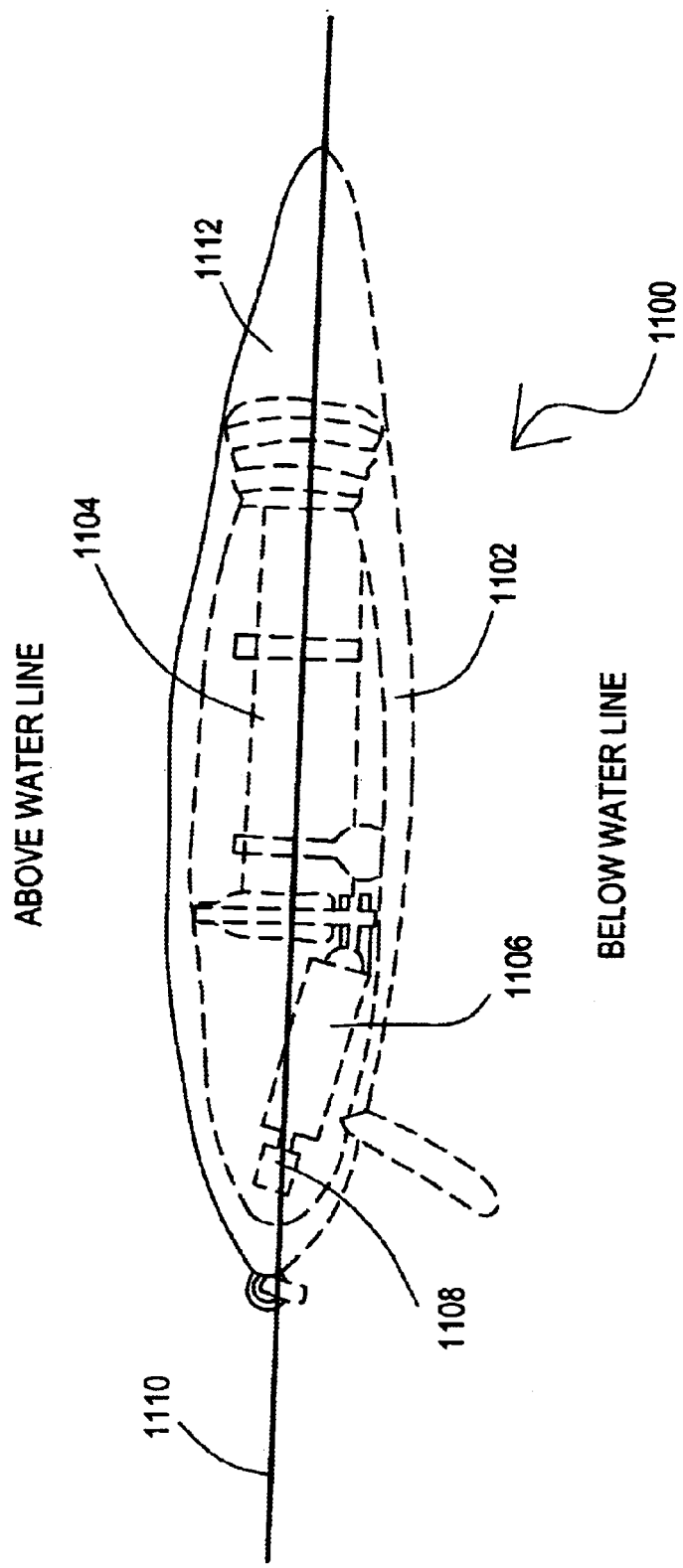
FIG. 11 shows a plane view of an embodiment of a fishing lure with the internal components visible relative to a line representing the surface plane of a body of water.

FIG. 11 shows an embodiment of a fishing lure 1100 that is configured to provide maximum ripple on the surface plane 1110 of water that the lure 1100 floats upon. The lure 1100 includes a lure body 1102 housing an elongated battery 1104 that powers an eccentrically weighted electric motor 1106. The motor 1106 has an eccentric weight 1108 attached to its shaft. As shown, the lure 1100 floats on the water and the eccentric weight 1108 lies within the surface plane 1110 of the water.

When the motor is energized, such as by activation of the circuits of FIG. 6, FIG. 7, or FIG. 13, the eccentric weight 1108 rotates to impart vibrations to the lure body 1102. The vibrations are most severe at the point on the lure body 1102 where the eccentric weight 1108 is most closely located.

Thus, by positioning the weight 1108 at the surface plane 1110, the amount of resulting ripple on the water surface is maximized. The lure 1100 is configured to float so that the weight 1108 lies within the surface plane 1110 by balancing the weight distribution properly. If the eccentric weight 1108 lies below the surface plane 1110, additional weight may be placed in the tail section 1112 to bring the eccentric weight 1108 upward to the surface plane 1110.

Figure 12:
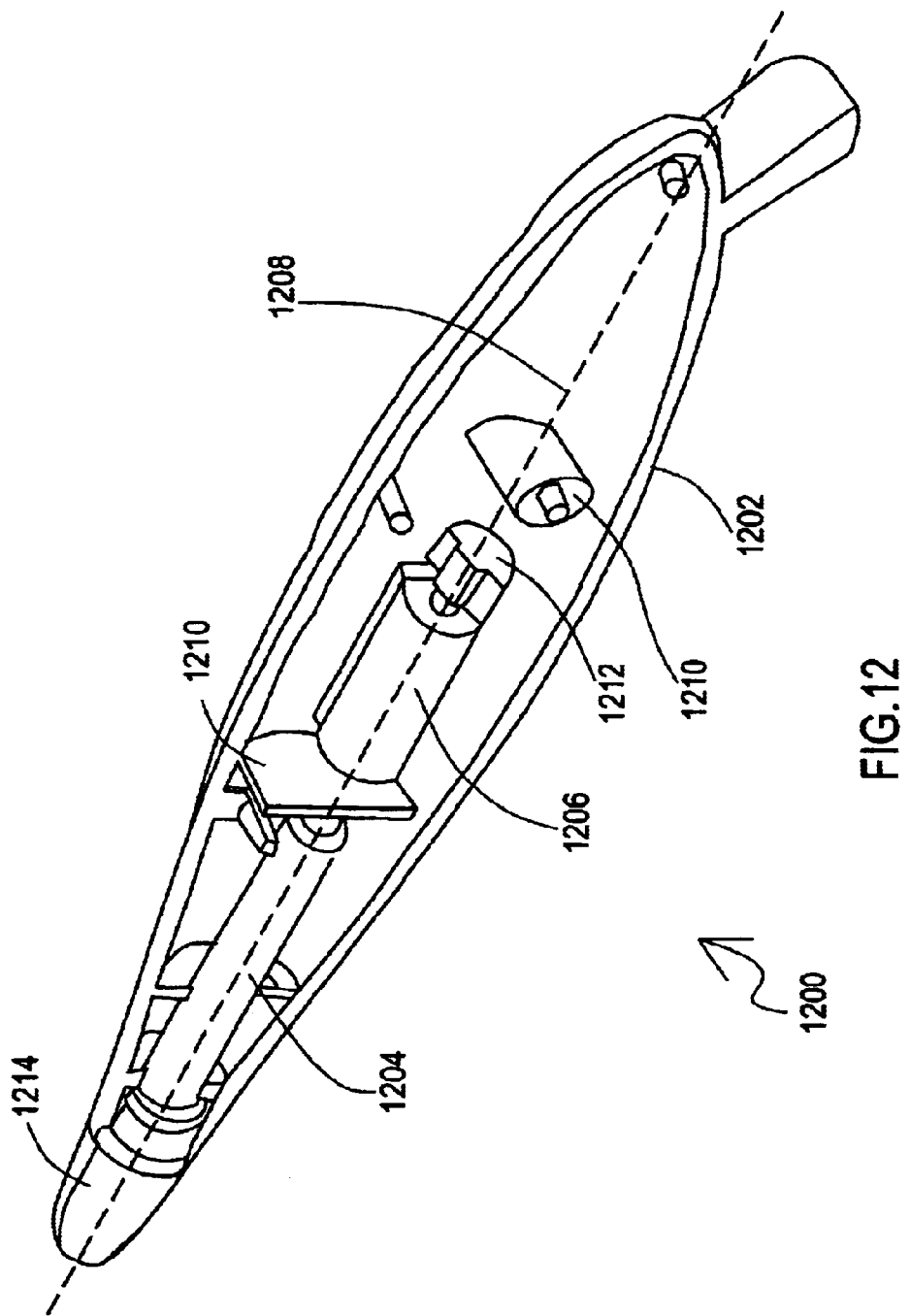
FIG. 12 shows an embodiment of a fishing lure having one half of the lure body removed to expose the motor and battery and their co-linear relationship to the lure body.

FIG. 12 shows an embodiment of a lure 1200 that maximizes the flashing of the lure, and one half of the lure body has been removed to show the relationship of the internal components. Flashing is the rotation about the longitudinal axis of the lure body, such as shown in FIGS. 8A and 8B. Flashing provides the intermittent reflection of light striking the lure body to a particular point in the water, which further simulates live bait. To maximize the flashing, the weight of the lure 1200 is positioned about a single longitudinal axis 1208 of the lure body 1202.

The electric motor 1206 has a longitudinal axis that is substantially colinear with the longitudinal axis 1208. Likewise, the battery 1204 has a longitudinal axis that is substantially co-linear with the longitudinal axis 1208. Also, the eccentric weight 1212 of the motor 1206 rotates about the longitudinal axis 1208. The balancing of weight about the longitudinal axis 1208 results in increased rotation of the lure body about the axis 1208 during the activation of the motor 1206. Thus, this arrangement aids flashing when continuously energizing the motor 1206 in one direction, when intermittently energizing the motor 1206 in one direction, or when intermittently reversing the direction of rotation of the motor 1206.

As shown, the lure 1200 includes aspects previously discussed. A tail section 1214 is included and engages the lure body. A circuit board 1210 controls the activation of the motor. Mounting studs 1210 may be used to lock one half of the lure body to the other half.

FIG. 13 shows an alternative to the circuit of FIG. 6 to provide intermittent power from a battery in the lure body to the eccentrically weighted motor also in the lure body. As shown in FIG. 13, the PNP transistor 1302 used to switch power on and off between the battery and the motor 1304 is placed between the positive battery node 1306 and the motor 1304, rather than between the motor 1304 and the negative node 1308. The circuit of FIG. 6 provides the PNP transistor between the motor and the negative node.

Figure 14:
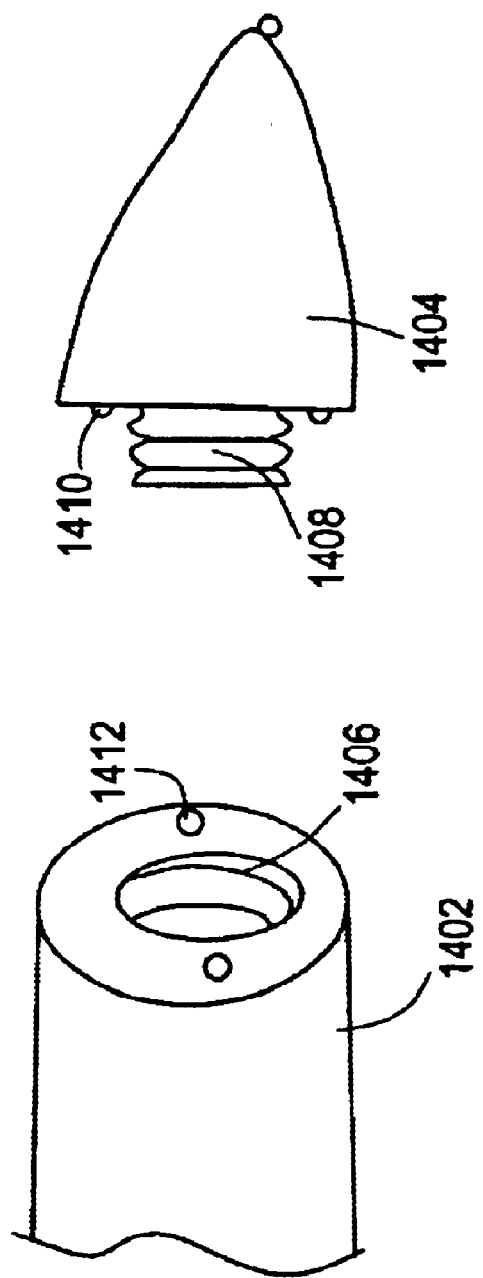
FIG. 14 shows an example of a locking mechanism for the removable tail section of an embodiment of a fishing lure.

FIG. 14 shows a locking feature for the connection of the tail section 1404 to the lure body 1402 for one embodiment of a lure. The lure tail 1404 has threads 1408 than engage threads 1406 in the opening of the lure body 1402. The tail section 1404 also has nubs 1410, and the lure body 1402 has indentions 1412. Upon threading the lure tail 1404 into the lure body 1402, the nubs 1410 eventually engage the indentions 1412 to resist further tightening of the tail 1404 to the body 1402 and thereby lock the tail 1404 to the body 1402. It will be appreciated that the locking mechanism may conversely provide nubs 1410 on the lure body 1402 and indentions on the tail 1404.

It is recognized that changes, variations and modifications may be made to the fishing lure of this invention, particularly by those skilled in the art, without departing from the spirit and scope of the invention. Accordingly, no limitation is intended to be imposed on this invention, except as set forth in the accompanying claims.

What is claimed is:

1. A vibrating fishing lure, comprising:

a lure body comprising a cavity;

a hook attached to the lure body;

a battery disposed within the cavity;

an electric motor disposed within the cavity and configured to impart vibrations to the lure body;

a first non-corrosive metal conductor exposed from the lure body;

a printed circuit board disposed within the cavity, the printed circuit board including circuitry for powering the electric motor from the battery, the printed circuit board comprising a first pin receptacle electrically connected to the circuitry, wherein the first non-corrosive metal conductor is partially disposed and frictionally fixed within the first pin receptacle;

a tail section mated to the lure body; and a second non-corrosive metal conductor exposed from the tail section and in electrical contact with a first electrode of the battery;

a third metal conductor in electrical contact with a first electrode of the battery, and wherein the printed circuit board further comprises a second pin receptacle electrically connected to the circuitry and the third metal conductor is partially disposed and frictionally fixed within the second pin receptacle.

2. The vibrating fishing lure of claim 1, wherein the second non-corrosive metal conductor comprises a spring that biases the battery.

3. The vibrating fishing lure of claim 1, wherein a locking mechanism is disposed between the tail section and the lure body.

4. The vibrating fishing lure of claim 1, further comprising:

a first and second motor lead, wherein the printed circuit board further comprises third and fourth pin receptacles electrically connected to the circuitry, and wherein the first motor lead is partially disposed and frictionally fixed within the third pin receptacle and the second motor lead is partially disposed and frictionally fixed within the fourth pin receptacle.

5. The vibrating fishing lure of claim 1, wherein the circuitry is configured to intermittently reverse the polarity of power applied to the electric motor.

6. A vibrating fishing lure, comprising:

a lure body comprising a cavity;

a hook attached to the lure body;

a battery disposed within the cavity;

an electric motor disposed within the cavity and configured to impart vibrations to the lure body, the electric motor including first and second conductor pins for receiving electric power;

a printed circuit board disposed within the cavity, the printed circuit board including circuitry for powering the electric motor from the battery, the printed circuit board comprising a first and second pin receptacles electrically connected to the circuitry, wherein the first and second conductor pins of the electric motor are at least partially disposed and frictionally fixed within the first and second pin receptacles;

a third pin receptacle on the circuit board and electrically connected to the circuitry; and a first non-corrosive metal conductor at least partially exposed from the lure body that is frictionally fixed within the third pin receptacle.

7. The vibrating fishing lure of claim 6, further comprising:

a tail section mated to the lure body;

a second non-corrosive metal conductor exposed from the tail section and in electrical contact with a first electrode of the battery.

8. The vibrating fishing lure of claim 7, wherein the second non-corrosive metal conductor comprises a spring that biases the battery.

9. The vibrating fishing lure of claim 7, wherein a locking mechanism is disposed between the tail section and the lure body.

10. The vibrating fishing lure of claim 6, further comprising:

a second metal conductor in electrical contact with a first electrode of the battery, and wherein printed circuit board further comprises a fourth pin receptacle electrically connected to the circuitry and the second metal conductor is partially disposed and frictionally fixed within the fourth pin receptacle.

11. The vibrating fishing lure of claim 6, wherein the circuitry is configured to intermittently reverse the polarity of DC power applied to the electric motor.

12. The vibrating fishing lure of claim 6, wherein the battery is cylindrical and elongated.

* * * * *